(12) United States Patent
Jilderos

(10) Patent No.: US 8,528,430 B2
(45) Date of Patent: Sep. 10, 2013

(54) MEASURING NEEDLE WITH NON RETURN VALVE FUNCTION

(75) Inventor: Daniel Jilderos, Boras (SE)

(73) Assignee: TA Hydronics AB, Ljung (SE)

( * ) Notice: Subject to any disclaimer, the term of this patent is extended or adjusted under 35 U.S.C. 154(b) by 0 days.

(21) Appl. No.: 13/519,354

(22) PCT Filed: Jan. 25, 2011

(86) PCT No.: PCT/SE2011/000011

§ 371 (c)(1),
(2), (4) Date: Jun. 27, 2012

(87) PCT Pub. No.: WO2011/112133

PCT Pub. Date: Sep. 15, 2011

(65) Prior Publication Data

US 2012/0320944 A1    Dec. 20, 2012

(30) Foreign Application Priority Data

Mar. 8, 2010   (SE) ...................................... 1000215

(51) Int. Cl.
| | | |
|---|---|---|
| *G01D 11/00* | (2006.01) | |
| *G01L 19/00* | (2006.01) | |
| *G01K 1/14* | (2006.01) | |
| *F16L 29/02* | (2006.01) | |
| *F16L 37/42* | (2006.01) | |

(52) U.S. Cl.
USPC ............. 73/866.5; 73/756; 374/143; 374/208

(58) Field of Classification Search
USPC ................ 73/714, 756, 866.5; 374/141, 143, 374/147, 155, 208, E1.011, E1.018
See application file for complete search history.

(56) References Cited

U.S. PATENT DOCUMENTS 4,638,668 A    1/1987    Leverberg et al.

FOREIGN PATENT DOCUMENTS

| DE | 93 02 151 U1 | 4/1993 |
| DE | 43 03 366 A1 | 8/1994 |
| GB | 2 019 533 A | 10/1979 |

*Primary Examiner* — Thomas P Noland
(74) *Attorney, Agent, or Firm* — Davis & Bujold, PLLC

(57) ABSTRACT

A device for measuring pressure or temperature in a heating or a cooling system and where the device is a measuring needle complete (1) comprising a measuring needle housing (6) with one cavity (20) and a spring-loaded non return valve (8), where the non return valve, in a measuring position, has an open communication with the probe (10) via the measuring needle housing and a hose nipple, via a hose, to a measuring instrument. This open communication is closed immediately as soon as the measuring is completed and the measuring needle (1) is removed from the measuring nipple. After measuring, due to this immediate closing, leakage of the enclosed fluid that exists in the complete measuring needle (1) and the measuring hose (5) is prevented.

11 Claims, 4 Drawing Sheets

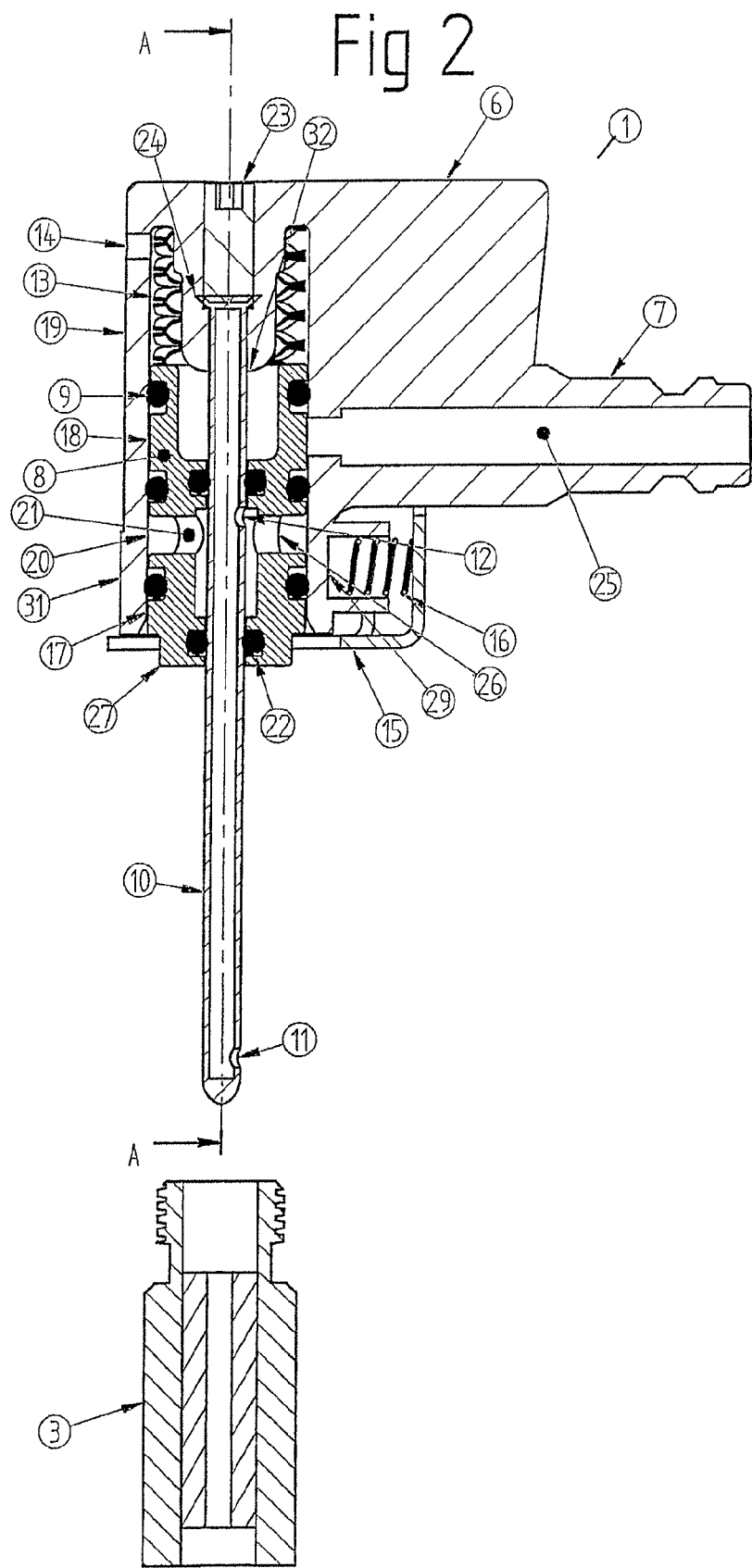

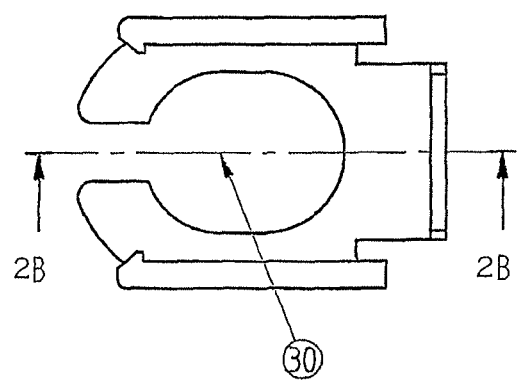
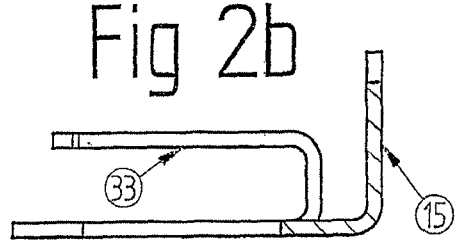
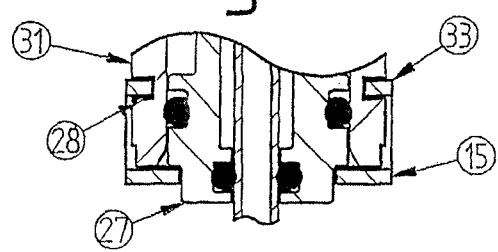

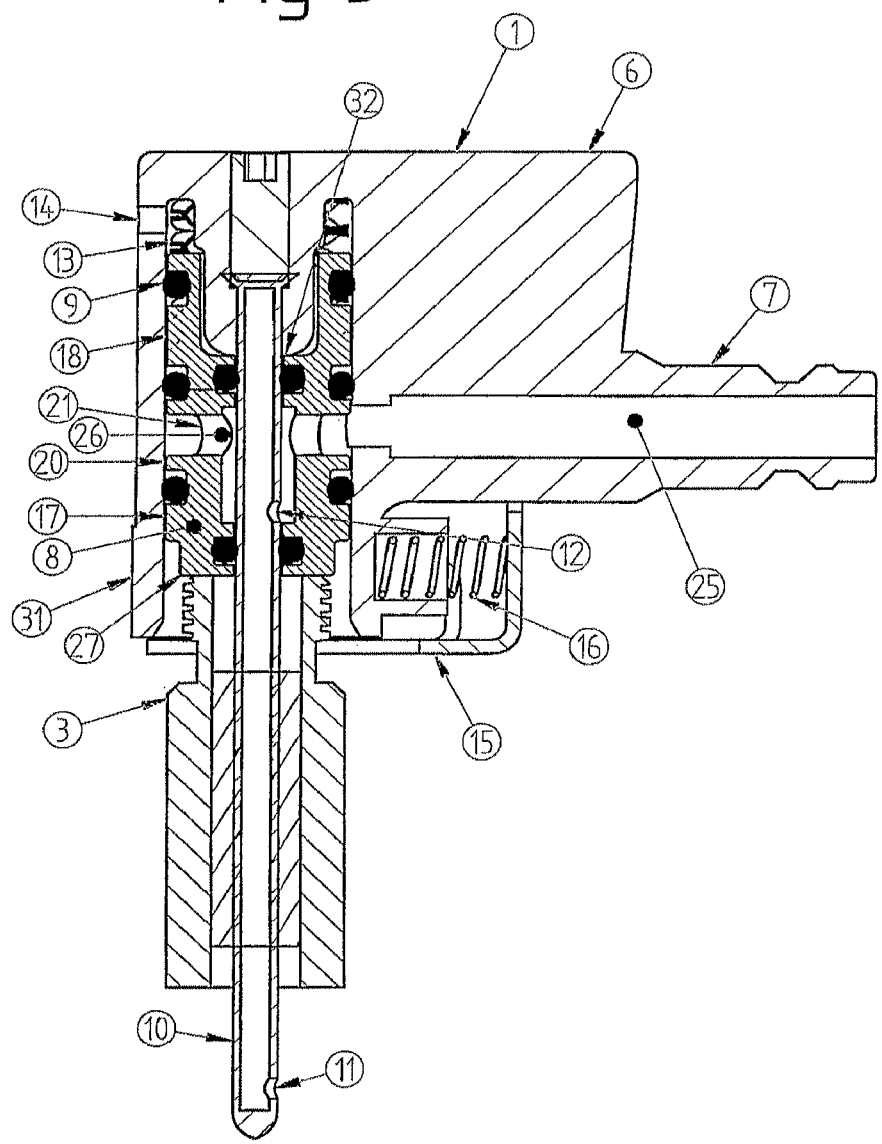

MEASURING NEEDLE WITH NON RETURN VALVE FUNCTION

This application is a National Stage completion of PCT/SE2011/000011 filed Jan. 25, 2011, which claims priority from Swedish patent application serial No. 1000215-2 filed Mar. 8, 2010.

FIELD OF THE INVENTION

The present invention relates to a device for measuring, for instance, pressure or temperature in a fluid system, for instance in a heating or cooling system and where the device is mounted on a measuring nipple, for instance a valve or a measuring nipple direct on a container or a piping, and where the device secures that there will be no unintentionally spillage or leakage by finishing the measuring, when the measuring needle with associated measuring hose is removed from the measuring nipple.

BACKGROUND OF THE INVENTION

The leakage from the pressurized medium in the heating or cooling system via the measuring nipple/nipples is no problem. The measuring nipples have alternative designs having a perfect function, also after long operating times.

There are a many constructions that solve the problem with unintentional leakage from the pressure medium to the environment by finishing the measuring. One example of such a solution is disclosed in GB 2 019 533 A where, according to FIG. 1, a spring-loaded ball 15 tightens the outlet 28 so that the interior overpressure and accordingly the medium don't leaks after completed measuring, also in the case when the operator has forgotten to mechanical close the channel 29 which is connected with the medium. Also U.S. Pat. No. 4,638,668 describes a coupling where the communication from the medium to the measuring hose 32—see FIG. 2—is opened when the measuring hose with its connecting end is mounted on the measuring nipple 2 and in connection with that the communication is opened from the pressurized medium up to the measuring hose 32. Later when the measuring hose is dismounted the communication will again be closed to the pressurized side.

SUMMARY OF THE INVENTION

In the now present invention it is secured that no leakage occurs from the side of the measuring hose, i.e. from that medium that is provided inside the measuring hose/hoses after finished measuring, to which the above-mentioned constructions don't provides any solution. Naturally it is presumed that the measuring nipples are so constructed that they don't leaks after finished measuring, but that is not the problem that deals with the present invention. Additionally a flush through of the measuring system is made possible in the now present invention, before the measuring is initiated, which is an important feature in order to remove air from the system, and to zero point calibrate a connected measuring instrument. This takes place by that a non return valve in opened position is shorted and that fluid is flushed through the complete measuring needle backwards, when two measuring needles is used in pairs, which they are during measuring and to this the above-mentioned constructions don't give any solution.

With the present invention a number of advantages compared to existing constructions are obtained in connection with the completing of a measuring:

a direct shutting off between the measuring hose and the probe occurs at the moment when the probe is removed from the measuring nipple no leakage occurs from the medium provided in the measuring hose no risk for injury of workers caused by an unintentional leakage from the probe a generally improved working environment by the measuring process and in the room because all leakage is eliminated the function of the non return valve of the complete measuring needle is shorted at the flush through which gives a more reliable measurement result the complete measuring needle is immediately prepared for a new measurement The constructive design of the present invention is described in detail below. In addition the invention leads the state of the art further in different aspects. This is realized in the present invention by that a device of the below described art is constituted in a way that is evident from the characterizing part of claim 1.

Further features and advantages of the invention are evident from the following description with reference to the attached drawings, showing a preferred, but not limiting embodiment of the invention.

BRIEF DESCRIPTION OF THE DRAWINGS

In detail represents in diametrical, partly schematically cross sections or perspective views:

FIG. 2 a specification of an embodiment of a complete measuring needle according to the invention. FIGS. 2a and 2c show an example of a design of a lock washer and the mounting against a lower part of the measuring needle housing, while FIG. 2b is a diagrammatic cross sectional view along section line 2B-2B of FIG. 2a.

FIG. 3 a measuring needle on a measuring nipple with open communication between probe/measuring nipple and the measuring instrument.

DETAILED DESCRIPTION OF THE PREFERRED EMBODIMENTS

Figure 1:
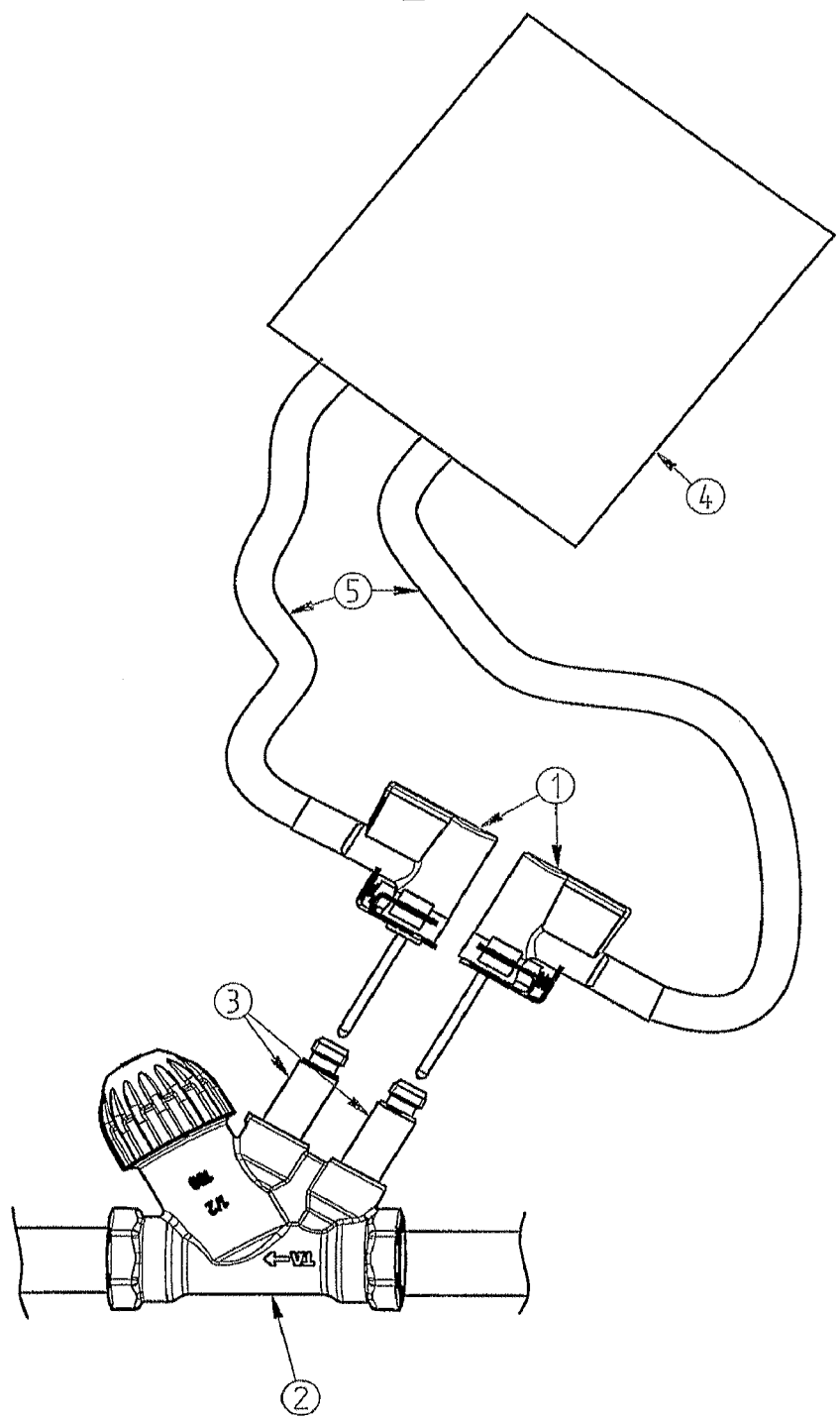
FIG. 1 a fluid system where the complete measuring needle is included.

FIG. 1 shows an example of how two measuring needles complete 1 are mounted on a measuring nipple 3 which in turn are included in a valve 2 or a tubing and in the figures are also shown schematic that from the measuring needle complete emanates measuring hoses 5 which in its other end are connected to a measuring instrument 4. To measure pressure or temperature in a piping or in a container or the like the complete measuring needle 1 is mounted on a measuring nipple 3 and attains in that way, via a probe 10, a connection with the medium that will be measured. The medium is then by flow in contact with the measuring instrument 4 via the probe 10, a measuring needle housing 6 and further via the measuring hose 5.

FIG. 2 shows a measuring needle complete in a sectional view. The complete measuring needle 1 comprises the measuring needle housing 6, with a hose nipple 7, for the connection of the measuring hose 5, a non return valve 8, the probe 10, a reset spring 13 and a lock washer 15 with a reset spring 16.

The measuring needle housing 6 is alternatively made of plastic or a metal alloy and is in its rear part 19, relative the hose nipple 7, provided with a cavity 20 which dimensionally is coordinated with the external dimensions of the non return valve 8. The cavity 20 is also provided with a recess 14 in its upper part and the recess 14 ends up to the environment. In the front part of the measuring needle housing 6 there is preferably a cylindrical made cavity 25 extending from the hose nipple 7 to the cavity 20 and where the cavity 25 as a result ends up in the hose nipple 7.

The non return valve 8 is described by different parts, a lower part 17 and a upper part 18, connected with a center part 21 with preferably smaller diameter compared to the two parts 17 and 18 respective. The center part 21 is also provided with one or more holes 26, preferably perpendicular to the longitudinal axis of the non return valve 8. External the two parts 17 and 18 are provided with gaskets 9 on the respective peripheral surface. The upper part 18 is provided with two gaskets placed on its external parts of the peripheral surface, while the lower part 17 is only provided with an external gasket placed on an approved position on the peripheral surface. Furthermore the both parts 17 and 18 are each provided with an interior gasket element, preferably a gasket 22 that preferably is positioned in the lower section of the parts.

In the upper part of the cavity 20 and above the non return valve 8 the non return valve 13 is mounted, and in this zone also the recess 14 is provided outwards to the environment. The upper part of the cavity includes also an interior stop lug 32 which is a stop lug for the non return valve 8 and constitutes consequently the upper limit position for the non return valve. The upper part of the cavity 20, in which the reset spring is mounted, has no contact with the fluid.

The probe 10 is fixed mounted in upper part of the measuring needle housing 6 and is fixed in a suitable manner, is for instance molded or is fixed with a socket head cap screw 23 pressing the rear, preferable corbelling, part 24 of the probe against the measuring needle housing and the probe is preferably also centered relative the non return valve 8. The probe is tubular and provided with two openings 11 and 12. The opening 11 is situated in the front part of the probe, near the end of the probe, while the opening 12 is situated at a tested distance upwards on the probe 10. The probe has a length outside, or beneath the measuring needle housing 6, which is adapted to the normally of the market existing measuring nipples so that the opening 11 always will reach the medium that has to be sensed by pressure or temperature when the measuring needle complete is mounted on or against the measure nipple 3.

Before the complete measuring needle 1 is connected to the measuring nipple 3, but when the probe 10 has passed the sealing element in the measuring nipple, and before the non return valve 8 is in physical contact with the measuring nipple 3, the probe is in contact with the medium which than fills up the probe and the center part 21 of the non return valve 8. In this position the non return valve 8 is still in its initial position and accordingly the gaskets 9 seals, on the upper part 18, against the upper part of the cavity 20 and against the cavity 25, and accordingly also against the measuring hose 5. Also the gasket 9, on the lower part 17, seals in this position against an exterior leakage. The interior gaskets 22 are sealing between the probe 10 and the non return valve 8.

On the measuring needle housing 6 and its lower part 31 the spring-loaded lock washer 15 is situated with the reset spring 16 mounted, the mounting and function of which is described below.

FIGS. 2*a*, 2*b* and 2*c* shows an example of the design of the lock washer 15 and the mounting against the lower part 31 of the measuring needle housing 6. On the lower part 31 of the measuring needle housing 6 the lock washer 15 is situated, and in connection with this the reset spring 16 to lock the complete measuring needle 1 on the measuring nipple 3 when a measuring is performed. The lock washer is preferably provided with an opening 30 which together with the non return valve 8 and the measuring nipple 3 constitutes two or more positions for the locking respective disengagement of the complete measuring needle 1 to or from the measuring nipple 3. On the lower part 31 of the measuring needle housing 6 there is preferably a groove 28 where the upper steering arm 33 of the lock washer 15 can slide perpendicular to the axial longitudinal direction of the non return valve and preferably a recess 29 in which the reset spring 16 is mounted. The reset spring is clamped between the lock washer 15 and the bottom of the recess 29. The lock washer 15 is fixed in its position by that the lower, preferably cylindrical part 27, of the non return valve 8 reaches through the opening 30 of the lock washer and in turn the lock washer constitutes a lower stop lug for the non return valve 8, since the lower part 17 on the non return valve has a larger dimension than the opening 30 of the lock washer.

FIG. 3 shows a measuring needle complete mounted on a measuring nipple. When the complete measuring needle 1 is mounted on the measuring nipple 3, the non return valve 8 is moved in the measuring needle housing 6 in axial direction against the reset spring 13 which therefore is compressed until the non return valve 8 reaches its upper position against the stop lug 32. In this position the non return valve 8 and its upper part 18 is moved as far backwards in the cavity 20 until the center part 21 of the non return valve has reached a position in front of the cavity 25 and in this position the gaskets 9 seals, on the upper part 19, against the upper part of the cavity 20 and the gasket 9 on the both sides of the connection of the cavity 25 against the cavity 20. When the non return valve 8 is in this upper position the communication is open from the medium via the probe 10 and its openings 11 and 12 up to the non return valve 8 and its center part 21 and further via the lock/locks 26 in the non return valve 8, through the cavity 25 and via the measuring hose 5 to the measuring instrument 4. In this position the same static overpressure is present as that of the medium, the whole way to the measuring instrument 4. When the communication in this position is open a flush through is allowed, by the construction of the non return valve 8, of the complete measuring needle in both directions. This is an advantage since the complete measuring needle during measuring works in pairs with another similar measuring needle, and then the fluid is flushed, owing to the pressure difference over the valve 2 in the direction from the high pressure side to the low pressure side, whereby the one measuring needle is flushed through backwards. In this working position the measuring system is flushed through and possible air disappear from the measuring hoses and the measuring instrument and hence the zero point calibrating of the instrument is secured which leads to a more certain measuring result.

To facilitate the connection of the complete measuring needle 1 on the measuring nipple 3, the recess 14 is provided which eliminates the risk of compressed air in the space above the non return valve 8 where the reset spring 13 is placed.

When the complete measuring needle 1 is mounted on the measuring nipple 3 the reset spring 16 presses the lock washer 15 outwards and the complete measuring needle 1 is locked on the measuring nipple 3. This is made possible by that there is a dimensional difference between the lower cylindrical part 27 of the non return valve 8 and the measuring nipple 3, where preferably the lower part 27 has a larger diameter than the measuring nipple, and when the non return valve 8, during connection of the complete measuring needle 1 on the measuring nipple 3, leaves its initial position and moves in direction to the reset spring 13, when the measuring nipple is pressed into the lower part 31 of the measuring needle housing, the measuring nipple lands, with its smaller diameter, in front of the opening 30 of the lock washer. By the design of the opening 30 in the lock washer 15 it is made possible for the reset spring 16 to press out the lock washer 15 and so the complete measuring needle 1 is locked on the measuring nipple 3. Accordingly the complete measuring needle 1 is fixed on place relative the measuring nipple 3.

The overpressure that occurs in the measuring hose 5 during the measuring procedure normally results in that the measuring hose 5 expands if this isn't of an inflexible material, which in this case leads to increased costs of the measuring hose 5 and to an unpractical montage work. With a complete measuring needle according to prior art a leakage will occur from the measuring hose, via the probe, in connection with a dismounting of the probe from the measuring nipple. The disadvantage by the prior art is that the fluid with the high pressure and in some cases also the high temperatures that existed in the expanded measuring hose is spurt out from the hole 11 of the measuring needle during removing from the measuring nipple 3, with risks for the operators heath.

The device according to the invention eliminates this risk of leakage from the measuring hose 5 in that, during disconnection of the complete measuring needle 1 from the measuring nipple 3, to begin the lock washer 15 is disconnected by pressing it inwards to the lower part 31 of the measuring needle housing 6. In this position the measuring nipple 3 is free in relation to the lock washer 15 whereupon the complete measuring needle 1 can be removed from the measuring nipple 3 and in that connection the reset spring 13 forces the non return valve 8 back to its initial position in the measuring needle housing 6. With the non return valve 8 in this position the lock washer will engage around the lower cylindrical part 27 of the non return valve 8 and accordingly the non return valve 8 is fixed in the position for the coming measuring.

When the non return valve 8 again reaches its initial position the two gaskets 9 mounted on the upper part 18 of the non return valve 8 will be situated on each side of the cavity 25 and its outlet in the cavity 20 and accordingly there exists a tightness from the cavity 25 upwards to the reset spring 13 as well as downwards to the non return valve 8 and its center part 21 and the open communication from the measuring hose 5 via the cavity to the non return valve 8 is consequently closed. Thus, with the non return valve 8 in this position, a leakage of medium is prevented from the measuring hose 5 to the environment.

The function in its whole of the complete measuring needle is that the non return valve 8 is moved to a position in the cavity 20 when a measuring is performed and that in this position there is an open communication from the medium the whole way to the measuring instrument 4 and that after the measuring is performed the compressed reset spring 13 will press the non return valve 8 backwards to the initial position where the non return valve closes the communication from the measuring instrument 4 and from the measuring hose 5 respective outwards to the probe 10 and accordingly the volume that is enclosed in the hose 5 cannot leak. The non return valve 8 also has other functions such as gasket element carrier and flowing channel. By the device conditions is created to use measuring hoses of normal quality, since the expansion that occurs at the measuring hose owing to overpressure, doesn't leads to a leakage from the measuring needle/probe, which is caused by earlier constructions of complete measuring needles.

COMPONENT LIST 1 measuring needle complete
2 valve
3 measuring nipple
4 measuring instrument
5 measuring hose
6 measuring needle housing
7 hose nipple
8 non return valve
9 gasket
10 probe
11 opening
12 opening
13 reset spring
14 recess
15 lock washer
16 reset spring
17 lower part
18 upper part
19 rear part
20 cavity
21 center part
22 gasket
23 socket head cap screw
24 corbelling
25 cavity
26 hole
27 lower part
28 groove
29 recess
30 opening of the lock washer
31 lower part of the measuring needle housing
32 stop lug
33 upper steering arm

The invention claimed is:

1. A device included in a system for measuring of pressure and/or temperature of a fluid and where the device is a measuring needle complete (1), where measuring needle complete comprises a measuring needle housing (6) with a hose nipple (7) for connecting a measuring hose (5), and where, in the measuring needle housing (6), a non return valve (8), a reset spring (13), a probe (10) and a lock washer (15) is provided, wherein the non return valve (8) is displaced into a cavity (20) of the measuring needle housing (6) in connection with that the measuring needle complete is mounted on a measuring nipple (3), whereby a communication is opened from the fluid via a first opening (11) in the probe (10), through the probe and further via a second opening (12) in the probe to the non return valve (8) and its center part (21) where the center part is provided with a hole (26) outwards to the cavity (20) and further via a cavity (25) to the hose nipple (7) and finally further via the measuring hose (5) up to a measuring instrument (4), and the communication is opened by that the non return valve (8) and its upper part (18) is moved as far backwards in the cavity (20) until the center part (21) in the non return valve has reached a position where an open communication with the cavity (25) is provided.

2. The device according to claim 1, wherein when the measuring needle complete (1) is removed from the measuring nipple (3), the reset spring (13) will press the non return valve (8) back to the initial position of the non return valve, whereby the communication from the measuring hose (5) and the cavity (25) is closed since gasket's (9) mounted on the upper part (18) of the non return valve (8) will be positioned on each side of the cavity (25) and its outlet in the cavity (20), and accordingly there is provided a tightness from the cavity (25) upwards to the reset spring (13) as well as downwards to the center part (21) of the non return valve (8) and accordingly it is also tight outwards to the opening (11) of the probe (10).

3. The device according to claim 1, wherein when the measuring needle complete (1) is mounted on the measuring nipple (3), a flush through of fluid is allowed through the complete measuring needle (1) in a direction away from the hose nipple (7) to the opening (11) by the non return valve (8) in that moment is positioned in its rear position in the cavity (20) and by a communication between the fluid and the measuring instrument (4) is open, and this occurs in one of the, by normally measuring procedure to the measuring nipples (3) in pairs connected, complete measuring needles (1) at the same time as the fluid in the other measuring needle flows in the opposite direction.

4. The device according to claim 1, wherein measuring needle housing (6) is provided with the cavity (20) which by dimensions is coordinated with the non return valve (8) and its outer gaskets (9), furthermore the cavity is provided with a recess (14) in its upper part to the surrounding, and a stop lug (32) in the upper part of the cavity where the stop lug provides for the upper limit position/working position of the non return valve (8).

5. The device according to claim 1, wherein the cavity (20) in the measuring needle housing (6) is provided with the recess (14) and the recess (14) eliminates the risk for compressed air in the space above the non return valve (8) when the non return valve is moved upwards to its upper position, against the stop lug (32).

6. The device according to claim 1, wherein the upper part (18) of the non return valve (8) and a lower part (17) are connected with the center part (21) with particularly a smaller dimension compared with the both parts (17) and (18) respective, where the center part (21) is provided with a number of holes (26) perpendicular to the longitudinal axis of the non return valve (8), where the parts (17) and (18) respective are provided with the gaskets (9) on the respective peripheral surface and an interior gasket element, a gasket (22), where the outer gaskets (9) seals against the cavity (20) and the interior gaskets (22) seals against the probe (10).

7. The device according to claim 1, wherein the lock washer (15) is mounted on a lower part (31) of the measuring needle housing (6) in a groove (28) and where the lock washer is provided with an opening (30) with varying cross section, and the lock washer cooperates with a reset spring (16) where the reset spring is constricted between the lock washer (15) and a recess (29) in the lower part (31) of the measuring needle housing (6) and where the opening (30) is selected in a way that the lock washer (15) engage the lower part (27) of the non return valve (8) and as a result the non return valve (8) is fixed in its position for the coming measuring.

8. The device according to claim 1, wherein the lock wash (15) also fixes the complete measuring needle (1) on the measuring nipple (3) by that, at the connection procedure, the complete measuring needle (1) is pressed against the measuring nipple (3), whereby the measuring nipple influences the non return valve (8) which leaves its working position and moves in direction against the reset spring (13), when the measuring nipple is pressed into the lower part (31) of the measuring needle housing, and then the measuring nipple, which normally has a smaller diameter than the lower cylindrical part (27) of the non return valve, ends up against the opening (30) of the lock washer, whereby the reset spring (16) presses the lock washer (15), which consequently locks the complete measuring needle (1) on the measuring nipple (3).

9. The device according to claim 1, wherein the upper end position of the non return valve (8) in the upper part of the cavity (20) is so adapted that the communication from the fluid to the measuring instrument (4) is open at that moment, but the lower end position of the non return valve (8) is the same as the initial position, before mounting on the measuring nipple (3) in which the non return valve then seals against the probe (10), and accordingly also against the first opening (11).

10. The device according to claim 1, wherein the upper end position of the non return valve (8) is determined of an, relative the upper end cover of the cavity (20), interior stop lug (32) and the lower end position of the non return valve is determined of the lock washer (15).

11. The device according to claim 1, wherein the non return valve (13) never is influenced by the fluid and this by that the exterior gasket (9) on the upper part (18) of the non return valve (8) always seals against the cavity (20).

* * * * *